United States Patent
Samanci et al.

(10) Patent No.: US 9,533,556 B2
(45) Date of Patent: Jan. 3, 2017

(54) SEALING ELEMENT HAVING AN INJECTION-MOLDED PART

(71) Applicant: CQLT SaarGummi Technologies S.à.r.l., Remich (LU)

(72) Inventors: Suleyman Samanci, Wadern (DE); Thomas Roeder, Losheim am See (DE)

(73) Assignee: CQLT SaarGummi Technologies S.à.r.l., Remich (LU)

( * ) Notice: Subject to any disclaimer, the term of this patent is extended or adjusted under 35 U.S.C. 154(b) by 0 days.

(21) Appl. No.: 14/948,870

(22) Filed: Nov. 23, 2015

(65) Prior Publication Data

US 2016/0144697 A1    May 26, 2016

(30) Foreign Application Priority Data

Nov. 24, 2014  (DE) .................... 10 2014 117 123

(51) Int. Cl.
| | | |
|---|---|---|
| *B60J 10/22* | (2016.01) | |
| *B60J 10/00* | (2016.01) | |
| *B60J 10/08* | (2006.01) | |

(52) U.S. Cl.
CPC ......... *B60J 10/0022* (2013.01); *B60J 10/0017* (2013.01); *B60J 10/0031* (2013.01); *B60J 10/08* (2013.01); *B60J 10/21* (2016.02); *B60J 10/24* (2016.02); *B60J 10/80* (2016.02)

(58) Field of Classification Search
CPC ......... B60J 10/16; B60J 10/21; B60J 10/2335; B60J 10/246; B60J 10/277; B60J 10/0022; B60J 10/0031; B60J 10/08; B60J 10/0017
USPC ...................................................... 49/479.1
See application file for complete search history.

(56) References Cited

U.S. PATENT DOCUMENTS

| | | | |
|---|---|---|---|
| 4,255,903 A * | 3/1981 | Reynolds .............. | E06B 7/2318 49/479.1 |
| 5,222,336 A | 6/1993 | Yada et al. | |
| 5,258,157 A | 11/1993 | Nozaki et al. | |
| 6,395,355 B1 * | 5/2002 | Nakajima ......... | B29C 45/14409 428/122 |
| 7,214,417 B2 * | 5/2007 | Kubo .................. | B29C 45/0053 428/136 |
| 2004/0247827 A1 | 12/2004 | Kubo et al. | |
| 2004/0250474 A1 * | 12/2004 | Kubo .................. | B29C 45/0053 49/479.1 |

FOREIGN PATENT DOCUMENTS

| | | | |
|---|---|---|---|
| JP | 2-3952 | * | 1/1990 |
| JP | H02 26933 U | | 2/1990 |
| JP | 3-8923 | * | 1/1991 |

(Continued)

OTHER PUBLICATIONS

German Search Report in DE 10 2014 117 123.3, mailed Jul. 27, 2015 with English translation of relevant parts.

(Continued)

*Primary Examiner* — Gregory Strimbu
(74) *Attorney, Agent, or Firm* — Collard & Roe, P.C.

(57) ABSTRACT

A sealing element includes a molded part including a tubular segment having a wall, a slit extending in the wall in a longitudinal direction of the tubular segment and recesses formed on the first longitudinal edge of the slit. The sealing element further includes tabs that keep the slit from gaping apart after unmolding the molded part.

8 Claims, 1 Drawing Sheet

(56) References Cited

FOREIGN PATENT DOCUMENTS

| JP | H04 16023 U | | 2/1992 |
|---|---|---|---|
| JP | H 6-305372 A | | 11/1994 |
| JP | 2006-082679 A | | 3/2006 |
| JP | 4434039 | * | 3/2007 |
| JP | 2010-162936 A | | 7/2010 |
| JP | 2012-116338 A | | 6/2012 |

OTHER PUBLICATIONS

European Office Action and Search Report in 15194962.5, dated Apr. 22, 2016, with English translation of relevant parts.

* cited by examiner

SEALING ELEMENT HAVING AN INJECTION-MOLDED PART

CROSS REFERENCE TO RELATED APPLICATIONS

Applicant claims priority under 35 U.S.C. §119 of German Application No. 10 2014 117 123.3 filed Nov. 24, 2014, the disclosure of which is incorporated herein by reference.

BACKGROUND OF THE INVENTION

1. Field of the Invention

The invention relates to a sealing element for forming a seal, particularly on doors or covers of a vehicle body. The element comprises a molded part produced from elastomer material or/and thermoplastic material, by means of injection-molding, having a tubular segment and an unmolding opening, which opening has a slit that extends in the longitudinal direction or/and transverse direction of the segment.

2. Description of the Related Art

In such known seals, the injection-molded part forms a corner segment of a seal on a vehicle door, for example, wherein the corner segment is injection-molded onto two strand segments that stand at an angle relative to one another. These strand segments make unmolding of the molded part difficult after injection-molding. In particular, it would hardly be possible to remove a core part of the injection-molding tool that forms the tubular segment on the inside, if the unmolding slit were not provided.

In order to prevent the unmolding slit from gaping apart after the molded part has been removed from the mold, the longitudinal edges of the unmolding slit, which lie opposite one another, are glued to one another in a complicated method.

SUMMARY OF THE INVENTION

The invention is based on the task of creating a new sealing element of the type stated initially, the removal slit of which can be permanently held together with slight effort, without an adhesive connection.

The sealing strand according to the invention that accomplishes this task is characterized by holding devices that keep the unmolding slit from gaping apart after unmolding of the molded part.

Preferably, these holding devices hold the unmolding slit together by means of shape fit.

It is practical if connection strands that engage over the unmolding slit are provided, which strands hold the unmolding slit together in the manner of an incision wound, for example.

Preferably, these connection strands are tabs that are flat in cross-section and disposed at a distance from one another in the longitudinal slit direction.

It is practical if the connection strands are injection-molded on in one piece during injection-molding during production of the molded part, and can be moved from their production-related position into their connection position by means of bending.

Alternatively, the connection strands can be produced separately from the molded part, if necessary in an injection-molding process that precedes injection-molding of the molded part.

Although the connection strands can extend alternatively from one and from the other longitudinal edge of the unmolding slit, for example, in a preferred embodiment of the invention they are all affixed to one of the longitudinal edges of the unmolding slit that lie opposite one another.

In a particularly preferred embodiment of the invention, the connection strands are provided for engaging into recesses on at least one side of the unmolding slit, in each instance.

The connection strands can be widened toward at least one strand end, and the recess can be widened in accordance with the widening, in order to produce a shape-fit connection.

In particular, the connection strands can be locked in place in their connection position, wherein a tongue/groove arrangement or/and a pin/hole arrangement can be provided for engagement.

In a further embodiment of the invention, the unmolding slit is open toward a wall segment provided for contact on a sealing seat.

Preferably, the connection strands that engage into the recesses end flush with the outer surface of the wall segment.

In a further preferred embodiment, the molded part is produced from a thermoplastic elastomer, while extruded strand segments onto which the molded part is injection-molded consist of ethylene propylene diene monomer (EPDM) synthetic rubber.

Thermoplastics are also possible as a material for the molded part or/and the strand segments.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF THE PREFERRED EMBODIMENTS

Figure 1:
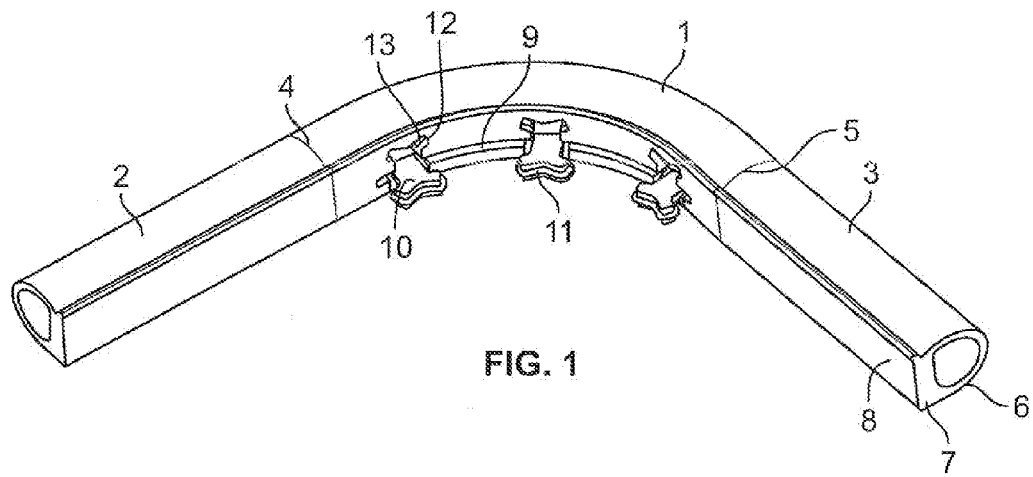
FIG. 1 shows a segment of a sealing element according to the invention, having an unmolding slit.
Figure 2:
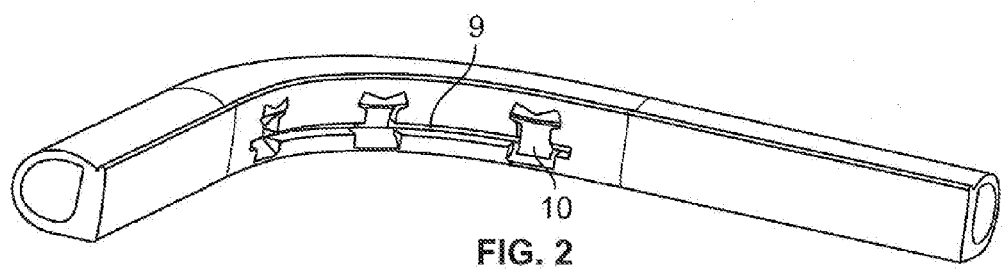
FIG. 2 shows the segment of FIG. 1 with the unmolding slit closed.
Figure 3:
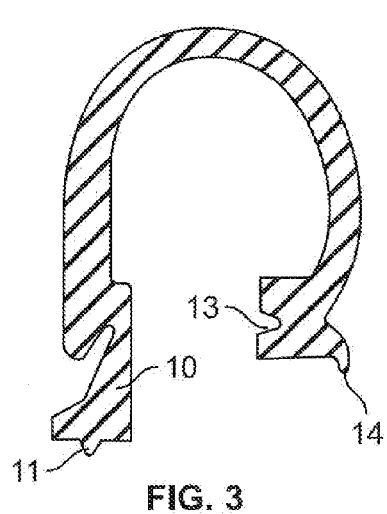
FIG. 3 is a cross-section of the sealing strand of FIGS. 1 and 2 with the unmolding slit open.

A sealing element for forming a seal on a vehicle door, shown in segments in FIGS. 1 and 2, comprises a curved molded part produced by means of injection-molding, composed of a thermoplastic elastomer, as well as segments 2 and 3 produced by means of extrusion, composed of EPDM, onto which the molded part 1 is injection-molded at 4 and 5. The curved molded part 1 forms a corner segment of the sealing element. Its cross-section essentially corresponds with the cross-sections of the segments 2 and 3.

The sealing element comprises a tubular sealing segment 6, which makes a transition into an attachment segment 7. The attachment segment 7 has a surface 8 provided for an adhesive connection with a seal seat on the vehicle door.

In the attachment segment 7, an unmolding slit 9 that opens toward the surface 8 is formed in the region of the molded part 1. A core part of an injection-molding tool that is curved in accordance with the molded part 1 can be removed through this unmolding slit 9. Without the unmolding slit 9, the core part would remain enclosed within the molded part 1 by means of the segments 2, 3.

Connection tabs 10, disposed at a distance from one another in the longitudinal slit direction, project approximately perpendicular to the surface 8 on one of the two longitudinal edges of the unmolding slit 9 that lie opposite one another; these tabs were injection-molded onto the molded part 1 during injection-molding of the molded part 1. As can furthermore be seen in FIG. 1, the connection tabs 10 are widened toward the free end. An engagement spring 11 that extends in the longitudinal direction of the edge surfaces projects from an edge surface of the connection tabs 10, in each instance.

Recesses 12 that are open toward the unmolding slit 9 are formed, opposite the connection tabs, in a tube wall that essentially forms the surface 8 and borders on the unmolding slit 9; these tabs widen with an increasing distance from the unmolding slit 9, in accordance with the widened regions of the connection tabs 10. An engagement groove 13 runs along the edge surface of the tube wall that borders on the recess, in its longitudinal direction.

A tongue 14 that runs along the longitudinal edge of the surface 8 facilitates adhesively connecting the sealing element to a seal seat, and forms a guide for a double-sided adhesive strip, for example.

Figure 4:
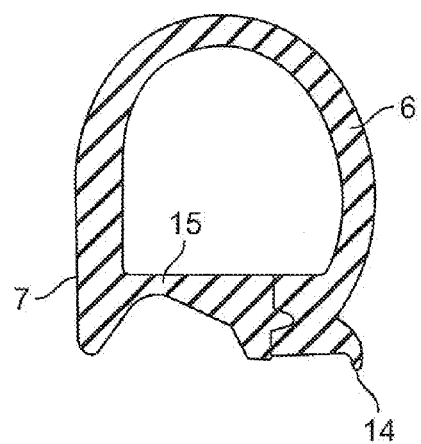
FIG. 4 is the cross-section of FIG. 3 with the unmolding slit closed.

As can be particularly seen in FIG. 4, the connection tabs can easily be bent, by means of a weak point formed at 15.

In the processing of the sealing element, particularly when adhesively connecting it and when pressing it down using a roller application device, the unmolding slit 9 must be prevented from gaping apart. The connection tabs 10 counteract this gaping apart; after unmolding, i.e. after removal of the said core part, these connection tabs are pivoted by 90° and pressed into the recesses 12, wherein the engagement springs 11 engage into the engagement grooves 12. The connection tabs 10 now no longer stand in the way of an adhesive connection with the seal seat and prevent the unmolding slit from gaping apart.

Although at least one embodiment of the present invention has been shown and described, it is to be understood that many changes and modifications may be made thereunto without departing from the spirit and scope of the invention.

What is claimed is:

1. A sealing element for forming a seal, the sealing elemement comprising:
   a molded part produced from at least one of an elastomer material by injection-molding and a thermoplastic material by injection-molding, the molded part comprising a tubular segment having a wall, an unmolding opening comprising a slit formed in the wall of the tubular segment and extending in a longitudinal direction of the tubular segment; and a plurality of recesses formed in a first longitudinal edge of the slit and in the wall of the tubular segment, each of the plurality of recesses defining an opening which is continuous with an opening of the slit, and
   a plurality of connection tabs that keep the slit from gaping apart after unmolding the model part, each of the tabs pivotally attached at a fixed end thereof to a second longitudinal edge of the slit and extends away from the second longitudinal edge, the second longitudinal edge being opposite the first longitudinal edge, each of the plurality of tabs having a generally planar section and being disposed in and engaging a respective recess of the plurality of one of the recesses, wherein,
   a free end of each of the tabs has a width in the longitudinal direction which is greater than a width in the longitudinal direction of the fixed end of each of the tabs and the plurality of recesses each widen in the longitudinal direction with an increasing distance from the slit to conform to the free end of a respective one of the tabs.

2. The sealing element according to claim 1, wherein the tabs are integrally molded with the molded part.

3. The sealing element according to claim 1, wherein each of the tabs is lockable in the respective one of the recesses.

4. The sealing element according to claim 3, wherein each of the tabs is lockable in the respective one of the recesses via a tongue and groove arrangement.

5. The sealing element according to claim 3, wherein the tabs are bendable.

6. The sealing element according to claim 1, wherein the wall of the tubular segment is adapted to be adhesively connected to a seal seat.

7. The sealing element according to claim 1, wherein the molded part forms a corner segment of the sealing element.

8. The sealing element according to claim 1, further comprising at least one extruded segment, wherein the molded part is injection-molded onto the at least one extruded segment.

* * * * *